US011615446B2

(12) United States Patent
Bundi (10) Patent No.: US 11,615,446 B2
(45) Date of Patent: Mar. 28, 2023

(54) METHOD AND SYSTEM FOR PROVIDING INTERACTIVE DIGITAL ADVERTISING

(71) Applicant: REZONENCE LIMITED, London (GB)

(72) Inventor: Prashanth Naidu Bundi, London (GB)

(73) Assignee: REZONENCE LIMITED, London (GB)

( * ) Notice: Subject to any disclaimer, the term of this patent is extended or adjusted under 35 U.S.C. 154(b) by 99 days.

(21) Appl. No.: 14/901,096

(22) PCT Filed: Jun. 25, 2014

(86) PCT No.: PCT/GB2014/051949
§ 371 (c)(1),
(2) Date: Dec. 28, 2015

(87) PCT Pub. No.: WO2014/207469
PCT Pub. Date: Dec. 31, 2014

(65) Prior Publication Data
US 2016/0148281 A1    May 26, 2016

Related U.S. Application Data

(60) Provisional application No. 61/839,395, filed on Jun. 26, 2013.

(51) Int. Cl.
*G06Q 30/02* (2012.01)
*G06Q 30/00* (2012.01)
(Continued)

(52) U.S. Cl.
CPC ......... *G06Q 30/0277* (2013.01); *G06Q 30/00* (2013.01); *G06Q 30/0208* (2013.01); *G06Q 30/0241* (2013.01)

(58) Field of Classification Search
None
See application file for complete search history.

(56) References Cited

U.S. PATENT DOCUMENTS

| 5,618,182 A * | 4/1997 | Thomas | G09B 7/04 434/118 |
| 6,296,487 B1 * | 10/2001 | Lotecka | G09B 7/02 434/118 |

(Continued)

FOREIGN PATENT DOCUMENTS

| CN | 1308264 | 8/2001 |
| CN | 1440620 | 9/2003 |

(Continued)

OTHER PUBLICATIONS

Trademark Electronic Search System (TESS), Google, Jan. 25, 2018, United States Patent and Trademark Office (Year: 2018).*

(Continued)

*Primary Examiner* — Kiersten V Summers
(74) *Attorney, Agent, or Firm* — Nixon & Vanderhye, P.C.

(57) ABSTRACT

The present invention relates to a method for providing interactive digital advertising. The method includes the display of a digital advertisement and several possible responses to an instruction relating to the advertisement to a user on a device. When a correct response is selected by the user, content is made accessible to the user. Several of the possible responses may be correct and/or the user may be given an opportunity to reselect one of the possible responses if their response is incorrect. A system is also disclosed.

29 Claims, 7 Drawing Sheets

US 11,615,446 B2
Page 2

(51) Int. Cl.
*G06Q 30/0241* (2023.01)
*G06Q 30/0208* (2023.01)

(56) References Cited

U.S. PATENT DOCUMENTS

| | | | |
|---|---|---|---|
| 6,636,247 B1* | 10/2003 | Hamzy | G06Q 30/02 705/14.73 |
| 7,886,334 B1* | 2/2011 | Walsh | G06Q 10/00 713/166 |
| 2001/0005199 A1* | 6/2001 | Anderson | G06F 3/0219 345/168 |
| 2001/0016858 A1* | 8/2001 | Bates | G06F 3/038 715/207 |
| 2001/0032092 A1* | 10/2001 | Calver | G06Q 30/02 705/1.1 |
| 2001/0049661 A1* | 12/2001 | Power | G06Q 30/02 705/51 |
| 2002/0046087 A1* | 4/2002 | Hey | G06Q 30/02 705/14.17 |
| 2002/0087642 A1* | 7/2002 | Wei | H04L 29/06027 709/206 |
| 2002/0194146 A1* | 12/2002 | Sirhall | G09B 7/00 706/14 |
| 2003/0163519 A1* | 8/2003 | Kegel | G06F 16/958 709/203 |
| 2004/0018479 A1* | 1/2004 | Pritchard | G09B 7/02 434/350 |
| 2004/0044697 A1* | 3/2004 | Nixon | G06Q 30/06 |
| 2005/0096983 A1* | 5/2005 | Werkhoven | G06Q 30/0277 705/14.73 |
| 2005/0137872 A1* | 6/2005 | Brady | G10L 13/033 704/269 |
| 2005/0149968 A1* | 7/2005 | Konig | G06K 9/00744 725/32 |
| 2007/0124201 A1* | 5/2007 | Hu | G06Q 30/02 705/14.2 |
| 2007/0157228 A1* | 7/2007 | Bayer | G06Q 30/02 725/34 |
| 2008/0026359 A1* | 1/2008 | O'Malley | G09B 7/06 434/323 |
| 2008/0032277 A1* | 2/2008 | Maggio | G09B 7/04 434/362 |
| 2008/0071881 A1* | 3/2008 | Kronlund | G06Q 30/02 709/217 |
| 2008/0221986 A1* | 9/2008 | Soicher | G06Q 30/02 705/14.36 |
| 2008/0281704 A1* | 11/2008 | Shuhy | G06Q 30/0275 705/14.71 |
| 2009/0210937 A1* | 8/2009 | Kraft | G06Q 30/02 726/17 |
| 2009/0281871 A1* | 11/2009 | Tietzen | G06Q 20/12 705/14.3 |
| 2010/0205276 A1* | 8/2010 | Quintarelli | H04L 65/601 709/217 |
| 2010/0228596 A1* | 9/2010 | Simons | G06Q 30/02 705/14.12 |
| 2011/0078778 A1* | 3/2011 | Gabriel | H04L 63/083 726/7 |
| 2011/0106631 A1 | 5/2011 | Lieberman et al. | |
| 2011/0124390 A1* | 5/2011 | Wilen | G06Q 30/02 463/9 |
| 2011/0153464 A1* | 6/2011 | Hendricks | G06Q 30/02 705/27.1 |
| 2011/0264494 A1* | 10/2011 | Lechowicz | G06Q 30/02 705/14.12 |
| 2012/0166294 A1* | 6/2012 | Lieberman | G06Q 30/0269 705/14.72 |

FOREIGN PATENT DOCUMENTS

| | | |
|---|---|---|
| CN | 1711542 | 12/2005 |
| CN | 101079137 | 11/2007 |
| CN | 101221583 | 7/2008 |
| CN | 101251919 | 8/2008 |
| JP | 2003-187141 | 7/2003 |
| JP | 2003-223128 | 8/2003 |
| JP | 2004-120324 | 4/2004 |
| JP | 2009-147532 | 7/2009 |
| JP | 2011-114555 | 7/2014 |
| WO | WO 2008/120624 | 10/2008 |
| WO | WO-2011028893 A1 * | 3/2011 ......... G06Q 30/0245 |

OTHER PUBLICATIONS

Trademark Electronic Search System (TESS), Solve Media, Jan. 25, 2018, United States Patent and Trademark Office (Year: 2018).*
Trademark Electronic Search System (TESS), JavaScript, Jan. 25, 2018, United States Patent and Trademark Office (Year: 2018).*
Trademark Electronic Search System (TESS), BMW, Jan. 25, 2018, United States Patent and Trademark Office (Year: 2018).*
Linda Bustos, Should You Use Google Consumer Surveys?, URL Capture date of Apr. 4, 2012, Get Elastic, Internet Archive Way Back Machine (Year: 2012).*
Tameka Kee, Why Google's Consumer Surveys are Good for Publishers (and Readers), Apr. 26, 2012, i Media Connection, (Year: 2012).*
Barry Schwartz, Google Launches Consumer Surveys, Mar. 29, 2012, Marketing Land Sections (Year: 2012).*
Trademark Electronic Search System (TESS), Javascript, Oct. 25, 2019, United States Patent and Trademark Office (Year: 2019).*
Merriam-Webster, Article, Jan. 13, 2022 (Year: 2022).*
International Search Report for PCT/GB2014/051949 dated Oct. 6, 2014, two pages.
Australian Examination Report issued in Australian Appln No. 2014300769 dated Mar. 22, 2019.
English Language Summary of Japanese Office Action issued in Japanese Appln No. 2016-522866 dated Jun. 5, 2018.
Canadian Examination Report issued in Canadian Application No. 2,916,931 dated Jul. 22, 2020.
Indian Examination Report issued in Indian Application No. 201647002718 dated Aug. 3, 2020.
Brazilian Preliminary Examination Report issued in Brazilian Application No. BR112015032318-9 dated Aug. 27, 2020.
Australian Examination Report No. 1 for Application No. 2020202023 dated Apr. 6, 2021 (5 pages).
British Examination Report for Application No. BR112015032318-9 dated Jan. 27, 2020 (4 pages).
Australian Examination Report for Application No. 2,916,931 dated May 21, 2021 (6 pages).

* cited by examiner

```
The publisher's name and logo

[ Navigation bar ]

The headline of the article

The first paragraph of the article.

The second paragraph of the article.

Please answer the question below to continue.

The graphic element of the ad

The hint is shown here. ~601
        [ Try again ] ~602
```

*FIG. 6*

The publisher's name and logo

Navigation bar

The headline of the article

The first paragraph of the article.

The second paragraph of the article.

The third paragraph of the article. ~701

- 
- 
-

The last paragraph of the article. ~701

*FIG. 7*

METHOD AND SYSTEM FOR PROVIDING INTERACTIVE DIGITAL ADVERTISING

This application is the U.S. national phase of International Application No. PCT/GB2014/051949 filed 25 Jun. 2014 which designated the U.S. and claims the benefit of U.S. Provisional Application No. 61/839,395 filed 26 Jun. 2013, the entire contents of each of which are hereby incorporated by reference.

FIELD OF INVENTION

The present invention is in the field of digital advertising. More particularly, but not exclusively, the present invention relates to displaying interactive digital advertisements to users.

BACKGROUND

A variety of ad formats, some of which are interactive, are currently used to advertise on web pages and applications on PCs and smartphones. The ads are typically displayed beside content the user is intent on accessing. However, due to a phenomenon known as ad blindness, most users, upwards of 90%, subconsciously ignore the ads. Ad blindness is a serious problem for the advertising and publishing industry as it severely reduces the effectiveness of ads.

Launching an ad campaign requires an advertiser to purchase ad inventory from publishers. Ad inventory is typically priced in units of 1000 impressions or CPM (cost per mille); an impression is deemed to have been delivered when an ad is shown to a user. Variations on the pricing structure exist but the CPM structure is by far the most common. Ad blindness has a severe effect on the CPM a publisher can charge advertisers as the bulk of the impressions are simply ignored. The ad inventory available to a publisher is dependent on the popularity of the publisher's content, which is finite. For example a website that receives ten million hits a month on average will have 10,000 units of CPM on average to sell a month. Therefore, ad blindness severely reduces the revenue that a publisher can generate from their finite ad inventory compared to what it might be if ad blindness could be eliminated. Attempts have been made to combat ad blindness by creating ad formats that are increasingly "flashy". These ads, commonly referred to as rich media ads, employ a series of effects to grab the user's attention, such as, animations, videos, sounds and changing the size and/or location of the ad on the page. The aim of these effects is to divert the user's attention away from the content to the ad. However, despite these ad formats, there has been very little effect on reducing ad blindness; temporary improvements are quickly lost as users rapidly adjust to any new formats and continue to ignore them. Ad formats that are overly aggressive in attempting to get a user's attention are also considered to be more annoying: a publisher risks losing their audience if the experience of using their service is negative.

In the battle to combat ad blindness, "pop-up" ad formats have also proliferated. These ads pop up to obscure the content the user has accessed, thereby forcing the user's attention away from the content and to the ad. These pop-up ads generally provide a means to dismiss them, typically via a "close" button. Although these ad formats appear to solve the problem of ad blindness, nothing could be further from the truth. When confronted with a pop-up ad, a user typically focuses on dismissing the ad as quickly as possible which generally entails locating and clicking on the close button. As a result the user's attention is focussed, not on the message of the ad but on the task of dismissing the ad. Pop-up ads are also considered to be highly annoying and a publisher that relies on them too much risks losing readers and therefore revenue. For the reasons stated above, pop-up ads are currently far less prevalent than the traditional ads which sit alongside the content.

The increase of aggressive ad formats and the resultant annoyance has given rise to a new range of products, commonly referred to as ad blockers. An ad blocker is typically software that runs in the background and prevents ads being displayed in a web browser, app or another digital display medium. A user who is running an ad blocker will be able to access and view content without seeing any of the ads, pop-up or otherwise. Although convenient for the user, this is hugely damaging to the publisher as the ad impressions they are able to deliver are reduced, thereby negatively impacting revenue.

Readers are another class of products that have appeared in conjunction with ad blockers. Readers programmatically access the content provided by a publisher and display this content to the user in a customised manner that is determined by the user. The user gets the benefit of viewing content in a manner of their choosing as opposed to the publisher's choosing. Apart from various formatting changes, a primary feature is the elimination of ads. As with ad blockers, publishers are once again deprived of impressions delivered, which therefore reduces revenue.

Another drawback with rich media ads, both of the pop-up and traditional formats is the attribution that is provided to an advertiser which is used to determine the amount billed. For a simple static ad, an impression is counted whenever the ad is displayed to the user. However, rich media ads typically require a certain amount of time before all their content has been presented to the user. For example, an ad that plays a short animation might begin once a web page has finished loading; however, the user might navigate away from the page before the ad has completed its animation. This creates a problem with regards to attribution. Should this impression counted as being delivered or undelivered? This uncertainty with regards to the delivery of rich media ads further reduces their earnings potential for publishers as advertisers are loathe to pay for undelivered or partially delivered content.

Advertising is just one avenue that publishers can use to raise revenue; they can also directly charge the user for access to their content. Subscriptions and one off payments for access to specific content are two of the common ways of directly charging users. The one off payments are typically termed micropayments due to small size of the figures charged; for example a micropayment of 10 cents can be made to read a single article. Although, these seem fairly obvious and sensible methods of raising revenue, they both suffer from serious drawbacks, primarily due to the ubiquity of free content available on the internet.

Subscriptions are typically charged on a monthly or annual basis and give the user access to content provided by the publisher. Multiple levels of subscription are sometimes provided that progressively provide more content with increasing costs. Verification is typically required to ensure that the content is accessible to only those customers who have paid for the content; a username and password combination is the most common way of implementing this. As already stated, the first major hurdle that publishers face is getting customers to sign up for a subscription. The internet has numerous free sources for content, so unless the publisher is able to provide content not available elsewhere, the likelihood of selling subscriptions is low. The internet has also provided an environment which has made it very easy for individuals to share content with each other. Publishers that only allow subscription-based access lose page views and therefore ad inventory as a fee paying customer will be unable to share content with a non-fee paying user. Hence apart from a small set of specialised content providers, most publishers do not depend on subscriptions as their primary source of revenue.

Micropayment systems have attempted to replace subscriptions and advertising as the primary revenue source for publishers. The concept is based on assigning a value to each item of content individually; a user would then only be required to pay for the content that they consumed on a pay-as-you-go basis. For example, a publisher could charge 10 cents per article which the user would have to pay before they gained access. The advantage here being that articles can be shared and users only pay for what they consume. In reality, however, micropayments have been far from successful as source of revenue. Firstly, the prevalence of free content and the ease with which alternative sources can be found on the internet have meant that users are inclined to simply search for and access free content rather than pay the small fee. Secondly, a payment requires the user to provide payment details together with additional inputs to verify their authenticity; this is time consuming and tedious and most users simply abandon the payment process even if they were initially willing to pay. To further make matters worse, financial institutions apply charges for cash transactions which further erode the revenues that publishers receive. Micropayments have therefore failed as a system to raise sustainable revenue for publishers.

Ultimately, publishers find themselves in a position where to stay competitive they have to provide content for free and depend on advertising revenue to keep their businesses afloat. However, the range of problems facing digital advertising has resulted in steadily decreasing advertising revenues threatening many publishers with financial ruin.

GOOGLE™ attempted to remedy the woes faced by publishers by the launch of GOOGLE™ Consumer Surveys (GCS) which is a service targeted towards online publishers. To benefit from the service, a publisher is required to include GCS provided code into their webpages which implement the features of the service. The service works as follows:

1. When a webpage is accessed by a user, only a portion (approximately 20%) of the content is made visible, the remaining content is greyed out.
2. A survey question is displayed together with predefined responses that can be selected with a single click.
3. When a response is provided, the next question together with responses is provided, unless it is the last question in which case the survey is deemed to have been completed.
4. Once the survey has been completed, the survey display is cleared and the remaining content on the website is revealed to the user.
5. GCS pays the publisher a small fee of typically five cents for every completed survey.

The alleged benefits of the GCS service are many and varied. Firstly, for a fee it provides interested parties with consumer feedback data on a large scale that can be rapidly deployed. A portion of this fee is paid to publishers who hosted the survey. Users are able to get access to content they might normally have had to pay for; it only costs them a little attention and a click or two. As the survey cannot be ignored, publishers are able to maximise earnings potential as none of their inventory is wasted.

Unfortunately for GOOGLE™, the GCS service was not as successful as expected. Users are generally impatient and want to get access to the content they're interested in as quickly as possible. It didn't take long for users to realise that the quickest way to dismiss the survey was to simply click on a response regardless of what the question or response options were. Feedback would be erroneous as there was no way to ensure that users were actually reading the question and providing a thoughtful response. Apart from the inherent inaccuracy of the service, the market for consumer surveys is also far smaller than the market for advertising. These flaws proved fatal to the business plan underlying the GCS service.

Another technique has been developed by Solve Media, Inc and is described in their patent publication No. US 2011/0106631 A1. This technique is a CAPTCHA (Completely Automated Public Turing test to tell Computers and Humans Apart) based system which is designed to prevent automated systems, also known as bots, from accessing content. This system involves the use of a question embedded within an advertisement which is displayed to the user. Access to the content is only provided if the user answered the question correctly.

This technique provides advantages which overcome some of the problems of the prior art. However, it would be useful to have an improved version of this technique which is, for example, not limited by the requirements to defeat bots.

It is an object of the present invention to provide an interactive digital advertising system which overcomes the disadvantages of the prior art, or at least provides a useful alternative.

SUMMARY OF INVENTION

According to a first aspect of the invention there is provided a method for providing interactive digital advertising, including:

a) displaying a visual digital advertisement to a user on a device;

b) displaying a plurality of possible responses to an instruction relating to the visual digital advertisement to the user on the device;

c) receiving selection of one of the possible responses from the user via the device;

d) providing access to content to the user when the selected response is one of a plurality of correct responses; wherein at least one of the possible responses is incorrect.

The method may further include displaying the instruction relating to the visual digital advertisement to the user on the device.

The visual digital advertisement, the instruction, and the plurality of possible responses may be displayed simultaneously.

The method may further include displaying a second visual digital advertisement when access to the content is provided. The second visual digital advertisement may replace the display of the visual digital advertisement. The second visual digital advertisement may be displayed at the end of a display of the content.

The visual digital advertisement, instruction, possible responses and/or the content may be displayed within a webpage.

The visual digital advertisement, instruction, possible responses and the content may be displayed within the same webpage.

The visual digital advertisement may comprise one or more graphics, videos, and/or an animations.

The plurality of possible responses may be displayed as buttons, within a drop-down box, or as a series of radio buttons.

Access to the content may be provided to the user by displaying the content to the user.

Before display of the visual digital advertisement, the content may be initially displayed to the user on the device for a period of time before being, at least, partially hidden and the entire content may be displayed when the selected responses is one of the plurality of correct responses.

The content may comprise one or more from video, text, pictures, and applications.

Before display of the visual digital advertisement, a part of the content may be initially displayed to the user on the device and the remainder of the content may be displayed when the selected response is one of the plurality of correct responses.

According to a further aspect of the invention there is provided a system including:
 a processor;
 a display;
 an input; and
 a memory;
wherein the system is configured for performing the method of the above aspect The system may further include a communications network and a server configured to transmit the visual digital advertisement and responses to the device. The server may be further configured to transmit the content to the device.

According to a further aspect of the invention there is provided a method for providing interactive digital advertising, including:
 a) displaying a visual digital advertisement to a user on a device;
 b) displaying a plurality of possible responses to an instruction relating to the visual digital advertisement to the user on the device;
 c) receiving selection of one of the possible responses from the user via the device; and
 d) providing access to content to the user when the selected response is a correct response.

The method may further include, when the selected response is incorrect, receiving selection of another of the possible responses from the user via the device until a correct response is selected and then providing access to the content to the user.

The method may further include displaying a hint for a correct response when the selected response is incorrect.

In one embodiment, at least one response is obviously correct and the remaining responses are obviously incorrect.

The instruction, in combination with the at least one correct response, may reinforce the message within the visual digital advertisement.

According to a further aspect of the invention there is provided a system including:
 a processor;
 a display;
 an input; and
 a memory;
wherein the system is configured for performing the method of the above aspect.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides an interactive digital advertisement method and system.

The inventor has discovered that, by requiring a response to an instruction relating to an advertisement (such as a question about the content of the advertisement), users absorb the message and/or brand within the advertisement. The inventor has further discovered that this occurs when several possible responses are provided as long as there is at least one incorrect response forcing the user to pay attention to the advertisement.

The result of these discoveries is that the inventor has devised a method and system for providing interactive digital advertisements where multiple correct possible responses can be provided to a user so that marketing information about users' choices can be captured while encouraging accuracy of that data by incentivising users to pay attention to the advertisement using the promise of access to restricted content.

The inventor has also discovered that users become frustrated with similar advertising systems which utilise CAPTCHA-based methods to prevent access to content to automated systems. This is because to implement a CAPTCHA-based system, the system must ensure that automated systems cannot answer the questions provided. It transpires that sufficiently difficult questions also provide challenges to users who can get the questions wrong or take some time to interpret the questions. Furthermore, in a CAPTCHA-based system, retries of the same question are not possible, because an automated system may then iterate through all the possible answers.

The result of this discovery is that the inventor has also devised a further method which displays a plurality of responses to an instruction relating to an advertisement and permits further attempts to provide a correct response. As part of the further attempts, hints can be provided to guide the user to the correct response. Once the correct response has been provided, access to content can then be provided to the user.

Figure 1:
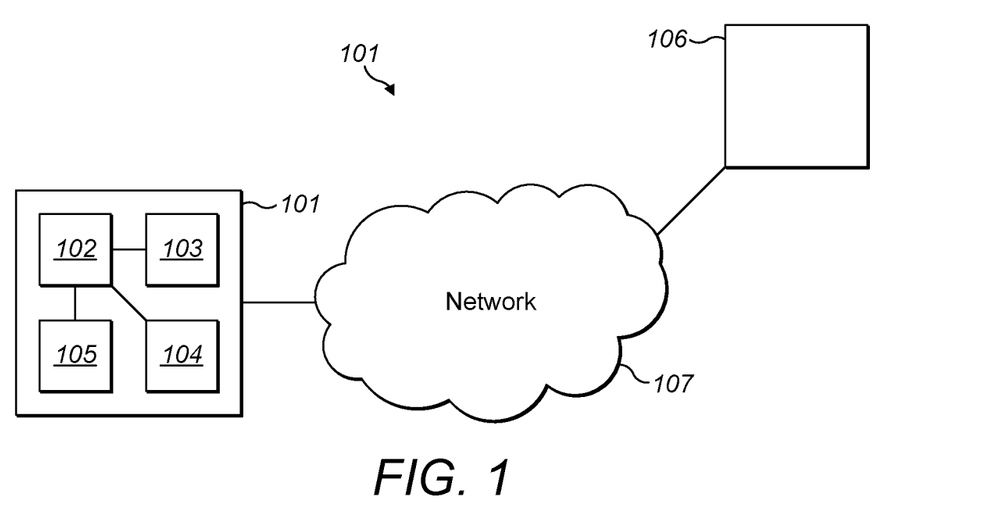
FIG. 1: shows a block diagram illustrating system in accordance with an embodiment of the invention.

In FIG. 1, a system 100 in accordance with an embodiment of the invention is shown.

A user device 101 is shown. The user device 101 includes a processor 102, a display 103, an input 104 and a memory 105.

The user device 101 may be, for example, a mobile device such as a smart-phone or tablet computer, a portable computing device, such as a laptop, or a computer.

The input 104 may be one or more of a touch-panel, such as for a touch-screen display; a keyboard; a mouse or other pointer device; a microphone; a gesture detection system; or any other input system.

The user device 101 may be connected to a server 106 via a communications network 107 such as the Internet.

The user device 101 may be configured for receiving a digital advertisement from the server 106, displaying, on the display 103, the advertisement along with a plurality of possible response for a instruction relating to the advertisement, receiving, via the input 104, a selection of one of those possible responses from the user, and providing access to content to the user if the possible response is a correct response to the instruction.

It will be appreciated that other architectures could be used, for example, the user device may receive the digital advertisement embedded within an application and the application may be received from the server or provided to the user device via a portable electronic medium, such as a digital optical disc or USB drive.

Figure 2:
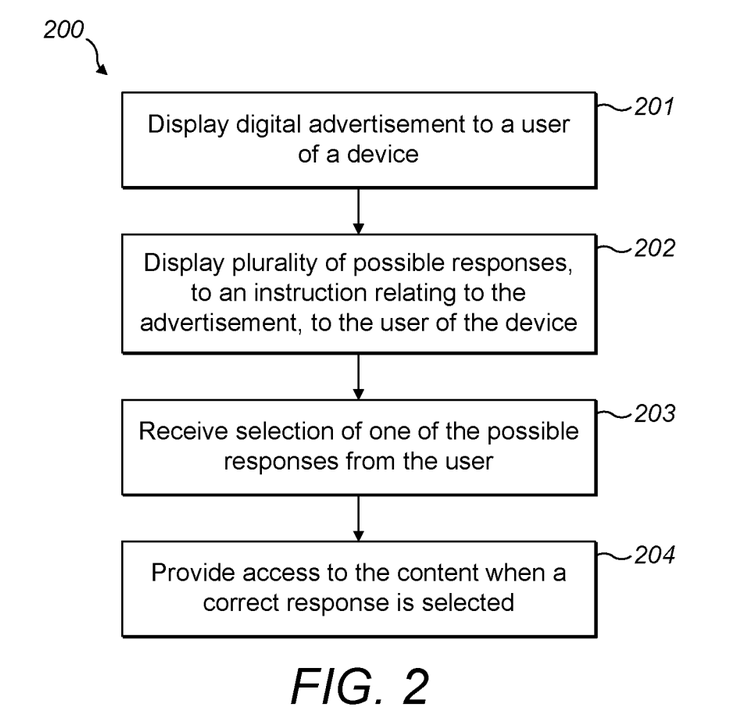
FIG. 2: shows a flow diagram illustrating a method in accordance with an embodiment of the invention.

In relation to FIG. 2, a method 200 of providing interactive digital advertising will be described.

In step 201, a visual digital advertisement is displayed to a user of a device. The advertisement may be received from a server. The advertisement may comprise one or more elements, such as graphics, photographs, animations, interactive animations, video and/or sound. The advertisement may be incorporated within a webpage and the webpage may be displayed by a browser on the user device.

In an alternate embodiment, the digital advertisement is embedded within an application.

In step 202, a plurality of possible responses to an instruction relating to the advertisement may be displayed to the user of the device. The instruction may be separately displayed/outputted or may be evident from the advertisement itself. The possible responses may be provided to the user as a set of buttons, a drop-down list, radio-buttons, check-boxes, or any other type of input selection mechanism. In one embodiment, the responses are displayed within the advertisement itself.

In one embodiment, of the possible responses, at least one response is incorrect, and at least two responses are possibly correct. The possible responses may be predefined for each advertisement or instruction, or may be dynamically prepared for each advertisement delivered from the server. The responses may be displayed with the advertisement within the webpage. In one embodiment, the advertisement and responses are displayed simultaneously.

In step 203, a selection of one of the possible responses may be received from the user at the device.

In step 204, if the selected response is one of the possibly correct responses, access to content may be provided to the user. The content may comprise one or more of the following elements: an application, an animation, a video, text, graphics, or photographs. Access may be provided to the user by displaying the content at the device.

In a preferred embodiment, step 203 is repeated until a correct response has been received from the user, whereupon access to content is provided to the user in step 204.

In one embodiment, the content is newly displayed to the user. In an alternative embodiment, the content is initially displayed to the user prior to display of the advertisement for a predefined period of time before being hidden. In yet another embodiment, the content may be partially displayed to the user, with the entire content displayed once a correct response is selected.

In one embodiment, the content is retrieved from the server when the correct response is selected (for example, by a component at the user device), or the content may have already been transmitted from the server to the device with the digital advertisement.

In one embodiment, a component at the user device may manage the display of the advertisement and possible responses, determination of the correct response, and display of the content. The component may be, for example, JAVASCRIPT™ executing within the browser of the user device. In another embodiment, management of the method may be distributed via multiple components across the user device and server.

In one embodiment, if an incorrect response is selected, a hint may be displayed and the user encouraged to reselect a response from the possible responses.

An example of an embodiment of the invention will now be described with reference to FIGS. 3a, 3b, 3c, and 3d.

Figure 3A:
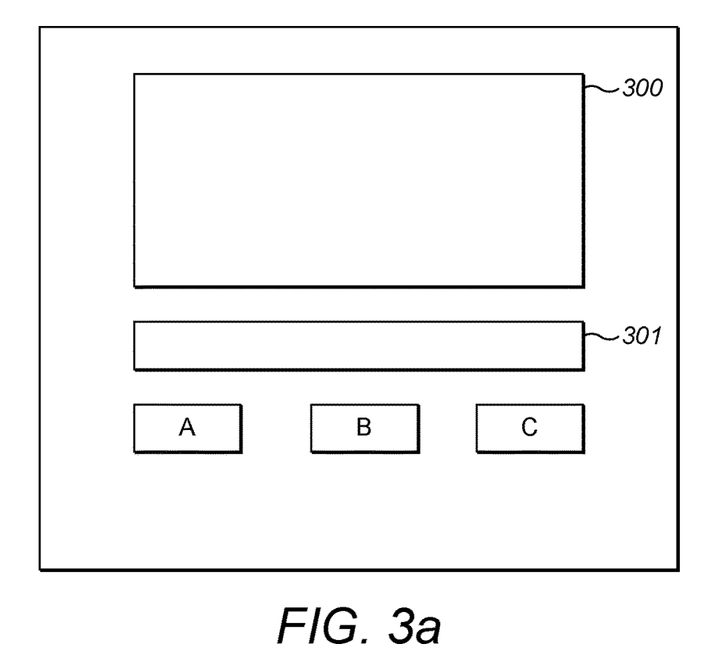
FIGS. 3a, 3b, 3c, and 3d; show a sequence of screenshots from displays generated in accordance with an embodiment of the invention.

FIG. 3a shows an advertisement 300, instruction 301 and possible responses (A, B, C) being displayed on a device.

Responses A and B are correct and response C is incorrect.

Figure 3B:
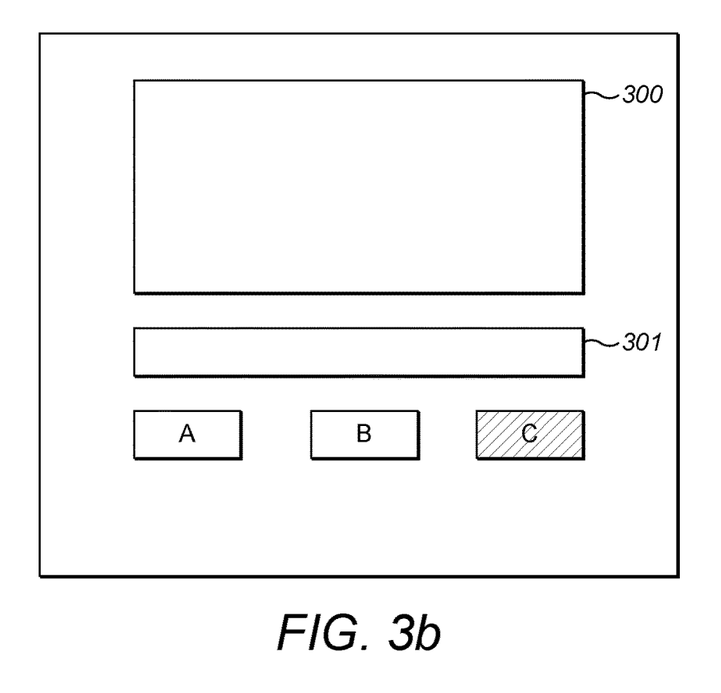

FIG. 3b shows a user selecting incorrect response C.

Figure 3C:
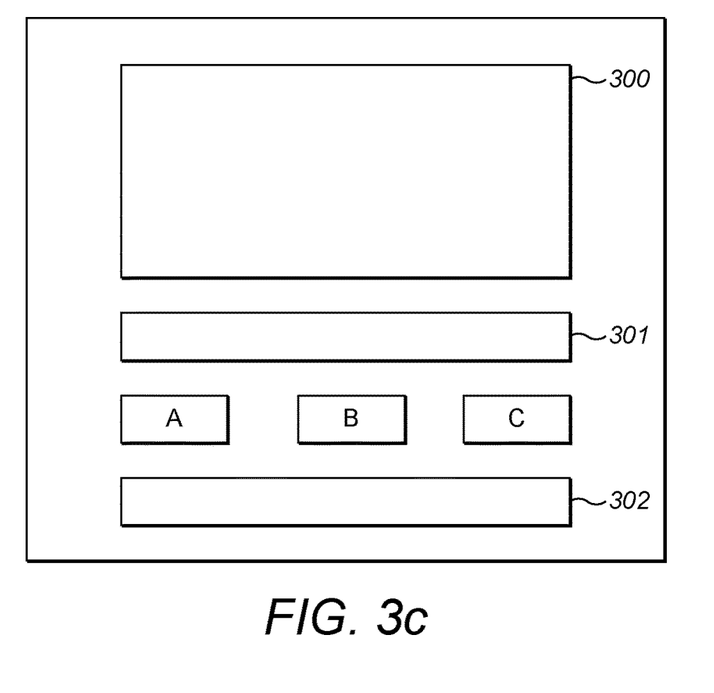

FIG. 3c illustrates the display of a hint 302 to the user in response to the incorrect response selection.

Figure 3D:
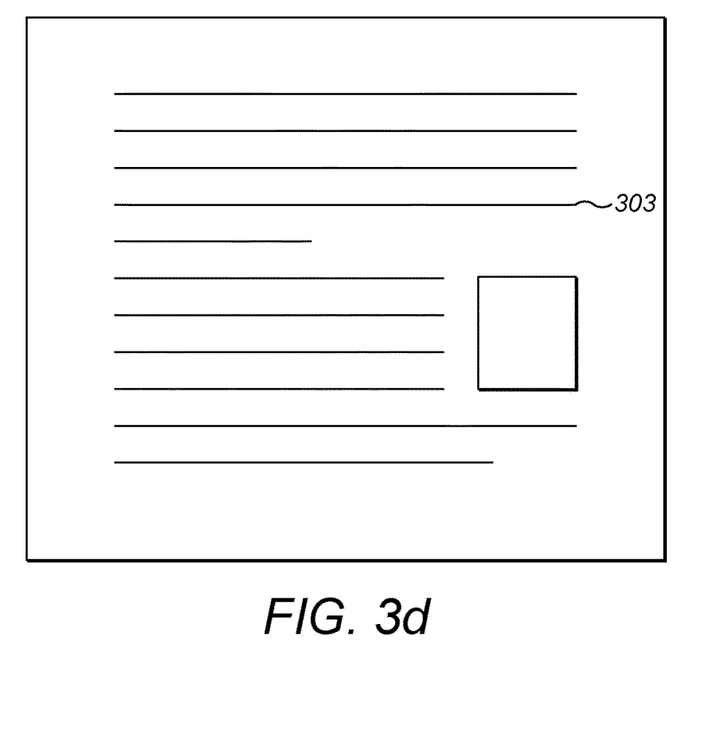

FIG. 3d illustrates the display of content 303 in response to the selection of correct response A by the user.

One embodiment of the invention will now be described with reference to FIGS. 4, 5, 6, and 7.

In accordance with this embodiment, an improved advertisement format displays an advertisement inline with the content a user has chosen to access; the advertisement is presented together with a question and predefined responses that can be selected with a single click; and the content following the advertisement is unavailable. The advertisement may be hidden and the following content made available when the correct response is provided by the user. Response options are provided such that there may be one obviously correct response while the others are obviously incorrect. The question together with the correct response may be designed to reinforce the message of the ad. Selection of a wrong response may result in a hint being shown that guides the user towards the correct response but the ad is not hidden and the following content remains unavailable unless and until the correct response is provided.

Figure 4:
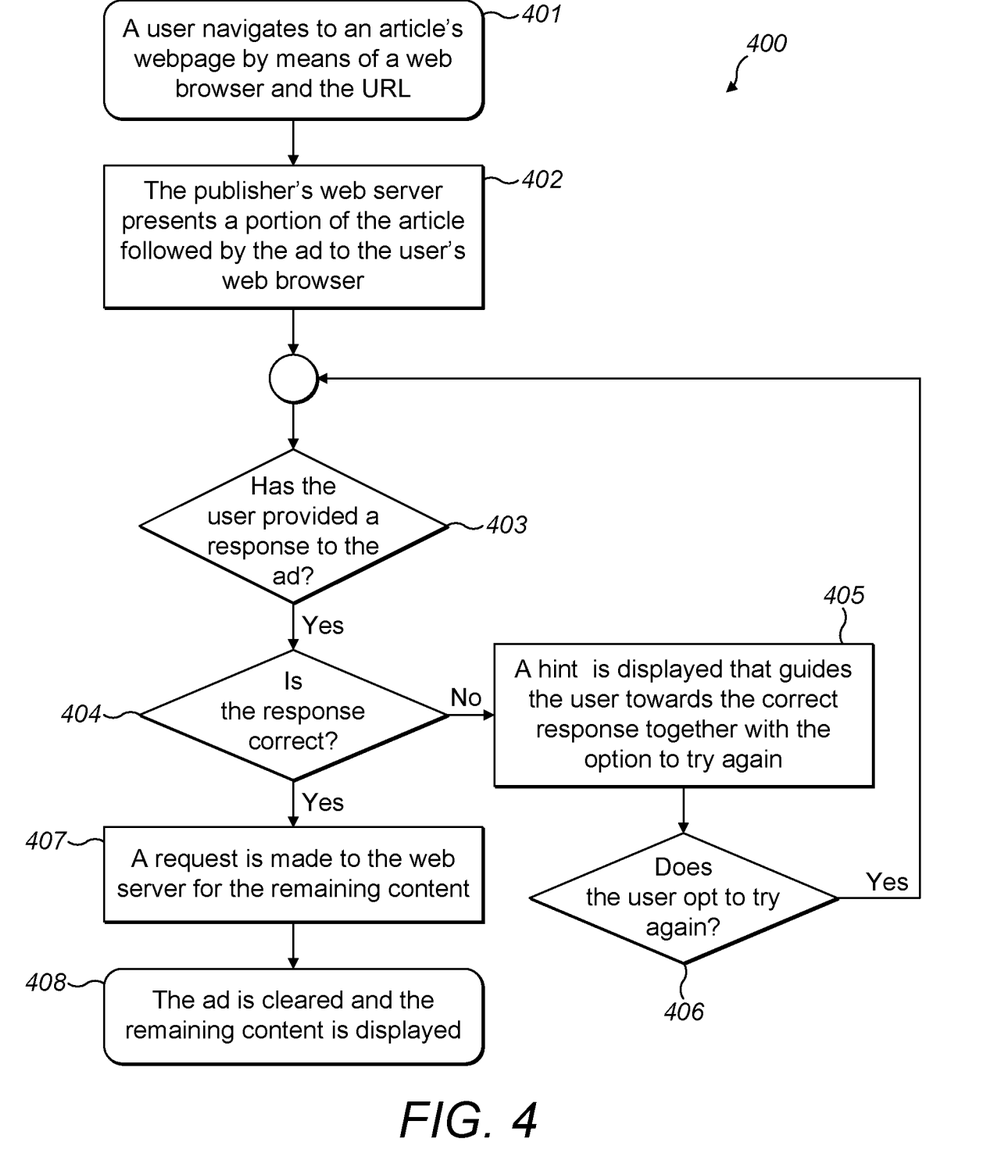
FIG. 4: shows a flow diagram illustrating a method in accordance with an embodiment of the invention.

A method 400 of this embodiment of the invention will be described with reference to FIG. 4.

In step 401, a user navigates to a publisher's webpage by means of the webpage's URL and a web browser on a computer, smartphone or any device that provides such functionality.

Figure 5:
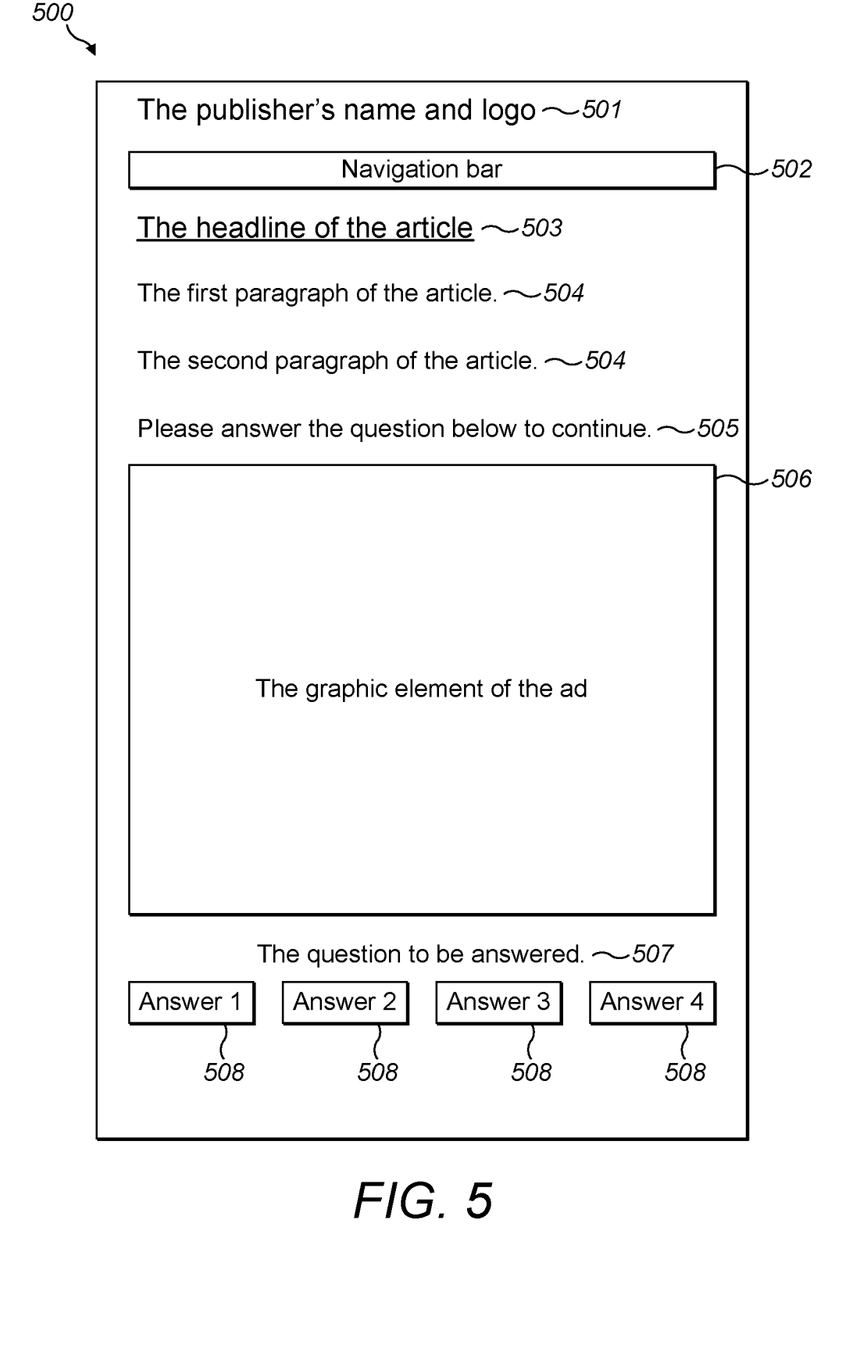
FIG. 5: shows screenshot displaying a web-page generated in accordance with an embodiment of the invention.

In step 402, the webpage is rendered in the user's web browser and shown on the device's screen or display as exemplarily depicted in FIG. 5. The publisher's webserver may relay HTML, CSS, JAVASCRIPT™, image files and any relevant additional data to the web browser on the device to enable rendering of the webpage.

In the example shown in FIG. 5, two paragraphs 504 of article are displayed in the web browser followed by the ad which requires response to display more of the article.

The ad consists of an instruction 505 to the user with regards to how to proceed, a graphic 506 that advertises a product, a question 507 and four buttons 508 that are labelled with predefined responses. The user is able to provide a response by clicking on any of the buttons. Although, at least one response should be correct while at least one should be incorrect, the preferred embodiment is to have one obvious correct response while the remaining responses are obviously incorrect. The question together with the obvious answer preferably combine to reinforce the message of the ad. For example, an ad for BMW™ the car maker could feature a graphic of one of their cars together with their tag line "The ultimate driving machine." The question could state "Who make the ultimate driving machines?", while the buttons could be labelled Elves, BMW™, Lilyputs, and Smurfs. One possible aim is to ensure that a user is able to quickly provide the correct response in order to proceed while at the same time imbibing the message of the ad.

In step 403, the user provides a response by clicking any one of the four buttons 508. A click can be made by means of a computer mouse or by the tap of a finger on a touchscreen or any hardware device that provides similar functionality.

In step 404, the user's response is tested by code (e.g. JAVASCRIPT™) that is executed on the user's device to determine if the response is correct or not. The code might be previously loaded and may execute within the web browser of the user's device to determine the validity of the response.

Figure 6:
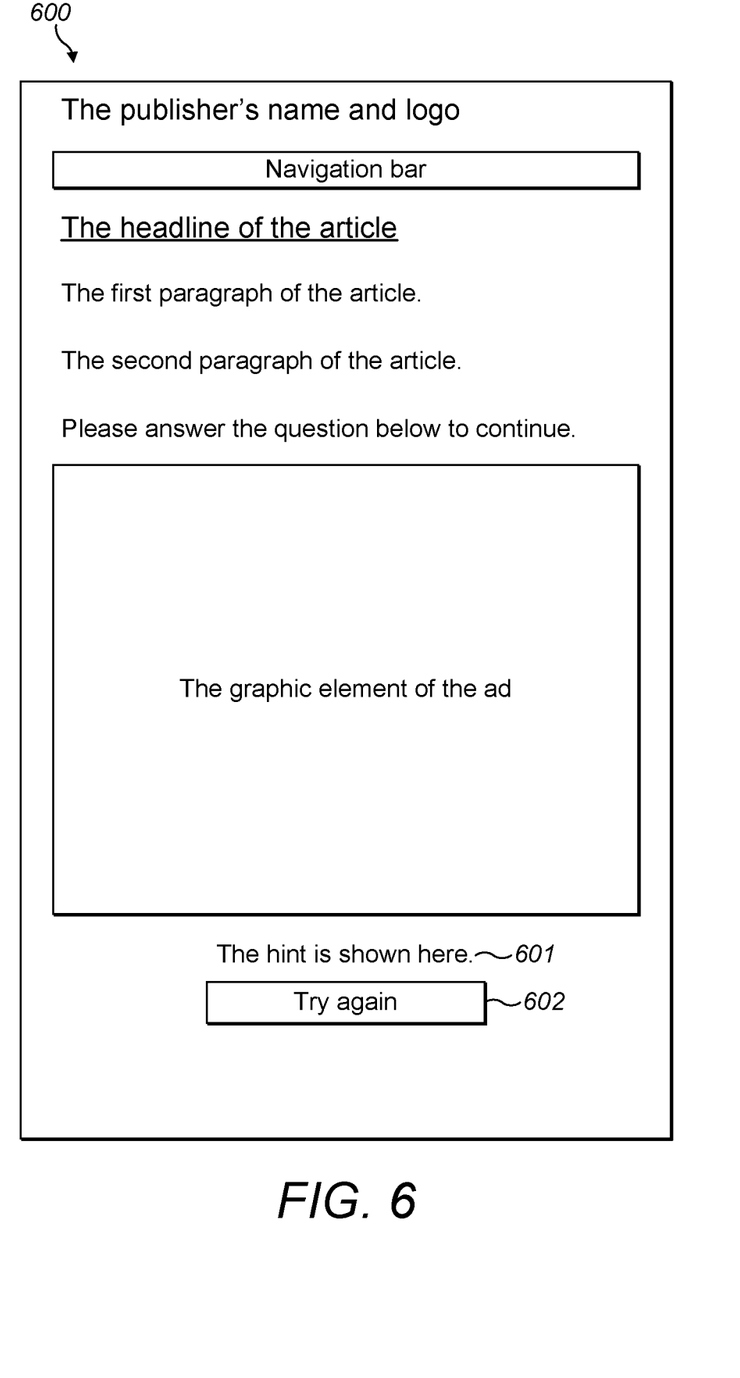
FIG. 6: shows screenshot displaying a web-page generated in accordance with an embodiment of the invention.

In step 405, if the response is incorrect, the webpage is transformed by the code executing on the user's device to that exemplarily shown in FIG. 6. The question 507 may replaced by a hint 601 and the response buttons 508 may be replaced by a single button 602, labelled "Try again". For example, the question could be replaced by a hint 601 reading "Hint: BMW™ make the ultimate driving machines" while the response buttons are replaced by the "Try again" button.

In step 406, the user can opt to try again by clicking on the "Try again" button 602 at which point the webpage is transformed back to its original form by the code executing on the user's device as exemplarily shown in FIG. 5. The user is once again able to provide a response.

If the response is correct, the remainder of the content of the article is requested from the webserver using the executing code in step 407

Figure 7:
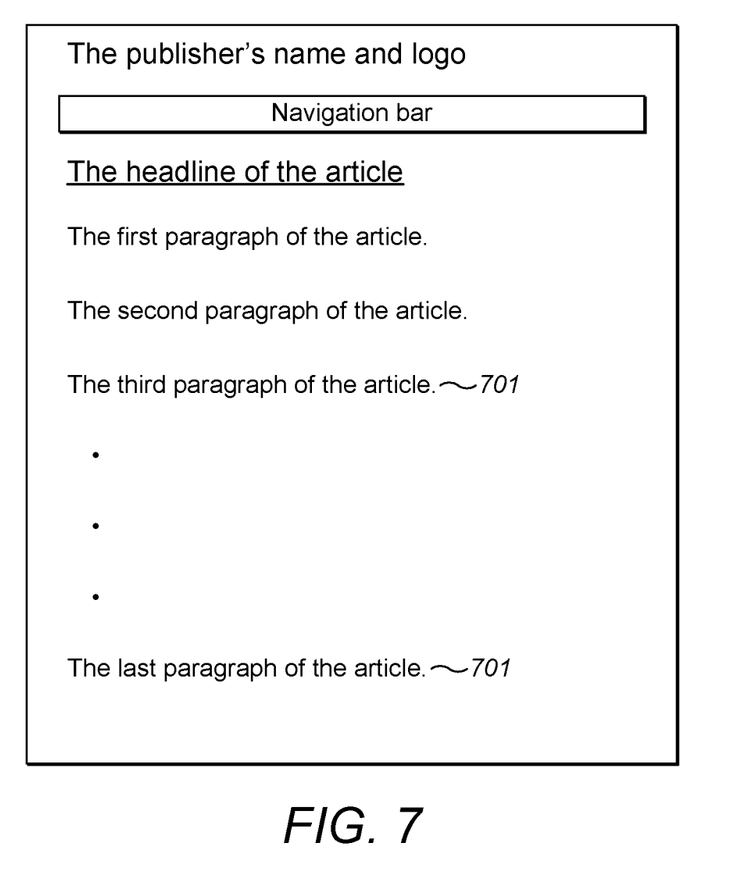
FIG. 7: shows screenshot displaying a web-page generated in accordance with an embodiment of the invention.

In step 408, on receipt of the remaining content from the webserver, the webpage is transformed by the code executing on the user's device to that exemplarily shown in FIG. 7; the ad is hidden or cleared and the article is displayed in its entirety on the user's device.

Although not crucial to the operation of the ad format, the code executing on the user's device can also perform the function of tracking a user's interaction with the ad. This tracking data can then be used to provide feedback to publishers and advertisers with regards to the performance of an ad campaign.

FIG. 5 shows an exemplary publisher's webpage 500, displayed in accordance with an embodiment of the invention, containing an article presented to a user within a web browser as a result of the user navigating to said webpage by means of an URL. The webpage consists of the publisher's name and logo 501, a navigation bar 502, the headline of the article 503 followed by a portion of the article 504 which in this case is the first two paragraphs. The content is then followed by an ad which consists of an instruction 505, an image 506, a question 507 and four buttons 508 which are labelled with predefined responses. The user is able to click on any of the said buttons to provide a response to the question. Of the responses, one may be obviously correct while the others may be obviously wrong.

FIG. 6 shows the resultant form of an exemplary webpage 600 after it has been transformed on the event of a user providing an incorrect response to the question 507. The question is replaced by a hint 601 and the four response buttons 508 are replaced by a single button 602 which is labelled "Try again".

FIG. 7 shows the resultant form of an exemplary webpage after it has been transformed on the event of a user providing a correct response to the question 507. The ad 505 to 508 is cleared and the remaining content 701 is displayed so the entire article is now visible to the user.

Alternative embodiments to the above described embodiment can be constructed based on the following modifications:

1. The instruction 505 can be elaborated, omitted or positioned in a different location or manner.

2. The graphic 506 may be omitted, positioned in a different location, have a different size, shape or appearance and could be a simple image, animation, video or any other form suitable to function as an ad.

3. The question 507 may be omitted, positioned differently or presented in a different manner so long as the user is still able to determine the correct response to provide when the webpage is rendered.

4. The answers may be changed or randomised every time the question and answers are displayed, so long as there is still at least one correct answer and one incorrect answer.

5. The response buttons 508 may be increased or decreased in number as long as there are at least two buttons as the ad format requires the ability to provide at least one correct and one incorrect response. The buttons may be positioned differently or have a different size, shape or appearance so long as the user is able to provide a response that can be tested to determine its validity.

6. The response buttons 508 may be replaced by another form of input such as radio buttons, check boxes, a text input field, a drop down list or any other form of input so long as the user is able to provide an input that can be tested to determine its validity.

7. The hint 601 and the button 602 to elect to try again may be omitted or changed in any manner, preferably, so long as the user is able to make repeated attempts to provide the correct response.

8. The ad in its entirety could be positioned differently, have a different appearance, pop-up or generally appear in a dynamic manner, preferably, so long as the end result is that a user is required to provide a correct response in order to view the full article. The elements of the ad unit could be separated spacially and temporally.

9. The sequence of events may be changed, preferably, so long as the user is required to provide a correct response in order to view the full article. The following are some examples:
   a) The ad is displayed at the start with no content visible, on a correct response the entire content is made available.
   b) The content is made fully visible initially for a brief period after which point the ad is made visible, in a manner that all or part of the content is unavailable until and unless a correct response is provided by the user.

10. The ad could be shown before or during a video; a correct response would have to be provided to view the entire video.

11. Additional input options may be provided that could enhance the ad format. For example, a text input box could be provided with a request for the user's email address. On providing an email address and the correct response, the user is sent a special offer via email.

12. The response mechanism could be built into the graphic as in the following examples:
   a) The user might be required to trace the outline of a new product; a trace within a predefined band would classify as a correct response.
   b) The user could also be required to "spot the difference" between two pictures with a click on a relevant part of the graphic being considered a correct response.

13. Code or computing instructions that provide the functionality of the ad format can be written in any single or multiple relevant computing languages and can be executed on either the user's device, webserver or a combination of both.

The above described embodiment is based on webpages that are accessed by means of a web browser. However, the ad format can be utilised in any environment which provides the user with a display and means of providing input; the following are a few examples:

1. The ad format can be deployed on applications for PCs, smartphones and tablets. The ad can be displayed either when the application starts up or during its operation. A user will need to provide the correct input in order to continue using the application.

2. Pay-per-view video or cable TV services can also employ the ad format. A user will be required to provide a correct response in order to continue viewing the content.

Potential advantages of some embodiment of the invention include:

1. As the ad cannot be ignored, ad blindness is eliminated which immediately ensures that a publisher's advertising real estate is worth significantly more, 10 times more if it assumed that currently 90% of ads are ignored.

2. Requiring a user to actively recall the message of the ad ensures it is much more deeply imprinted in a user's mind compared to passive exposure.

3. Responses can be tracked which ensures that attribution with regards to how many users interacted with the ad is precise and meaningful.

4. Ad blocking software and content readers are ineffectual as the content will remain unavailable until and unless the correct response is provided.

5. The ad format can be deployed on any system that has a display and is able to accept user input. Therefore, any content delivered by such devices can be monetised using this ad format.

6. The ability to accept more than one correct response provides advertisers with a powerful means of gaining insight into a user's perception of their brand or product.

7. Tracking data can be used to provide analytics to advertisers and publishers which can be used to assess the success of an ad campaign and with attributing fees.

Accordingly, several advantages are revealed for advertisers; firstly, the ad cannot be ignored, secondly, requiring the user to actively recall the message of the ad results in a significantly deeper mental impression as opposed to being passively exposed to the message. Thirdly, attribution is precise; it is possible to measure the number of impressions and responses which provides advertisers with greater certainty with regards to the distribution of their ads.

Similarly several advantages are revealed for publishers. The benefits derived for the advertisers should ensure that publishers can charge a significantly higher CPM, thereby increasing the revenue from advertising. Publishers can make their content freely available and therefore maximise their potential readership which in turn maximises revenue. Furthermore, ad blocking software and readers will be ineffectual ensuring that publishers do not lose revenue due to such products.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A computer-implemented method for providing interactive digital advertising within a browser executing on a user device, including:

receiving a webpage from a server, the webpage including an article for display and a reference to an executable code component;

the executable code component receiving a visual digital advertisement from the server;

the executable code component executing within the browser, in response to receiving the visual digital advertisement from the server, transforming the received webpage to restrict access to a restricted portion of the article in the webpage and simultaneously display, within the browser, the visual digital advertisement and an unrestricted portion of the article, wherein the visual digital advertisement is displayed inline with the unrestricted portion of the article;

the executable code component further transforming the webpage to simultaneously display, within the browser, an instruction relating to the displayed visual digital advertisement and a first plurality of responses to the instruction relating to the visual digital advertisement in the webpage within the browser, wherein the first plurality of displayed possible responses includes a plurality of different correct responses, that are obviously correct, and at least one incorrect response, that is obviously incorrect, to the displayed instruction, the instruction and the plurality of different correct responses of the first plurality of displayed possible responses reinforce a message of the visual digital advertisement, and the visual digital advertisement, the instruction relating to the displayed visual digital advertisement and the first plurality of possible responses are simultaneously displayed within the browser;

the executable code component receiving selection of one of the first plurality of displayed possible responses from the user via the user device;

the executable code component, in response to the executable code component determining that the selected responses is one of the plurality of different correct responses, requesting at least a portion of the restricted portion of the article from the server and receiving the portion of the restricted portion of the article from the server in response to the request;

the executable code component, in response to receiving the portion of the restricted portion of the article, transforming the webpage back to the received webpage to hide the displayed visual digital advertisement and the plurality of displayed possible responses and to simultaneously display the restricted and unrestricted portions of the article in the webpage within the browser such that an entirety of the article is displayed;

the executable code component further transforming the transformed webpage to replace the displayed instruction and the first plurality of possible responses with a hint for a correct response and an option to re-display the instruction and a second plurality of possible responses when the executable code component determines that the selected response is one of the at least one incorrect response; and the executable code component further transforming the transformed webpage to simultaneously display the instruction and the second plurality of possible responses to the instruction within the browser when the executable code component determines a selection of the option to re-display the instruction and the second plurality of possible responses, wherein the second plurality of possible responses includes a plurality of different correct responses and at least one incorrect response to the displayed instruction;

wherein, before display of the visual digital advertisement, a portion of the restricted portion and a portion of the unrestricted portion of the article are initially displayed to the user on the device for a period of time before the restricted portion of the article being, at least, partially hidden and the hidden restricted portion of the article is displayed when the selected response is one of the plurality of different correct responses.

2. A method as claimed in claim 1, wherein the second plurality of possible responses are different from the first plurality of possible responses.

3. A method as claimed in claim 1, wherein the visual digital advertisement, the instruction, and the first plurality of possible responses are displayed simultaneously.

4. A method as claimed in claim 1, further including: displaying a second visual digital advertisement in the webpage within the browser after access to the article is provided.

5. A method as claimed in claim 4, wherein the second visual digital advertisement replaces the display of the visual digital advertisement.

6. A method as claimed in claim 4, wherein the second visual digital advertisement is displayed at an end of the article.

7. A method as claimed in claim 1, wherein the visual digital advertisement, the instruction, the first plurality of possible responses and the unrestricted portion of the article are simultaneously displayed.

8. A method as claimed in claim 7, wherein the visual digital advertisement, the instruction, the first plurality of possible responses and the article are displayed within a same webpage.

9. A method as claimed in claim 1, wherein the visual digital advertisement comprises one or more graphics, videos, and/or an animations.

10. A method as claimed in claim 1, wherein the first plurality of possible responses are displayed as buttons.

11. A method as claimed in claim 1, wherein the first plurality of possible responses are displayed within a dropdown box.

12. A method as claimed in claim 1, wherein the first plurality of possible responses are displayed as a series of radio buttons.

13. A method as claimed in claim 1, wherein the visual digital advertisement is positioned in the webpage between the unrestricted portion of the article and the restricted portion of the article, and the instructions are displayed between the visual digital advertisement and the first plurality of possible responses to the instruction.

14. A method as claimed in claim 1, wherein the article comprises text and pictures.

15. A method as claimed in claim 1, wherein, before display of the visual digital advertisement, the executable code component initially displays a portion of the restricted portion and a portion of the unrestricted portion of the article and the portion of the restricted portion of the article is hidden from display when the visual digital advertisement is displayed.

16. A system including:
a processor;
a display;
an input; and
a memory;
wherein the processor is communicatively coupled to the display, the input and the memory, and is configured to:
executing a browser application;
receive a webpage from a server, the webpage including article for display and a reference to executable code component; and
executing the executable code component within the browser to:
receive a visual digital advertisement from the server;
in response to receiving the visual digital advertisement from the server, transforming the received webpage to restrict access to a restricted portion of the article in the webpage and simultaneously display, within the browser displayed on the display, the visual digital advertisement and an unrestricted portion of the article, wherein the visual digital advertisement is displayed inline with the unrestricted portion of the article;
further transforming the webpage to simultaneously display, within the browser, an instruction relating to the visual digital advertisement and a first plurality of possible responses to the instruction relating to the visual digital advertisement in the webpage within the browser, wherein the first plurality of displayed possible responses includes a plurality of different correct responses, that are obviously correct, and at least one incorrect response, that is obviously incorrect, to the displayed instruction, the instruction and the plurality of different correct responses of the first plurality of displayed possible responses reinforce a message of the visual digital advertisement, and the visual digital advertisement, the instruction relating to the displayed visual digital advertisement and the first plurality of possible responses are simultaneously displayed within the browser;
receive, from the input, selection of one of the first plurality of displayed possible responses;
in response to the executable code component determining that the selected response is one of the plurality of different correct responses, requesting at least a portion of the restricted portion of the article from the server and receiving the portion of the restricted portion of the article from the server in response to the request;
in response to receiving the portion of the restricted portion of the article, transforming the webpage back to the received webpage to hide the displayed visual digital advertisement and the plurality of displayed possible responses and to simultaneously display the restricted and unrestricted portions of the article in the webpage within the browser such that an entirety of the article is displayed;

further transforming the transformed webpage to replace the displayed instruction and the first plurality of possible responses with a hint for a correct response and an option to re-display the instruction and a second plurality of possible responses when the executable code component determines that the selected response is one of the at least one incorrect response; and further transforming the transformed webpage to simultaneously display the instruction and the second plurality of possible responses to the instruction within the browser when the executable code component determines a section of the option to re-display the instruction and the second plurality of possible responses, wherein the second plurality of possible responses includes a plurality of different correct responses and at least one incorrect response to the displayed instruction;

wherein before display of the visual digital advertisement, a portion of the restricted portion and a portion of the unrestricted portion of the article are initially displayed to the user for a period of time before the restricted portion of the article being, at least, partially hidden and the hidden restricted portion of the article is displayed when the selected response is one of the plurality of different correct responses.

17. A system as claimed in claim 16, further including a communications network and configured to transmit the visual digital advertisement and plurality of possible responses to the processor.

18. A system as claimed in claim 17, wherein the server is further configured to transmit the article to the processor.

19. The system of claim 16, wherein the executable code component within the browser is configured to transform the received webpage to restrict access to the restricted portion of the article and to simultaneously display the visual digital advertisement and the unrestricted portion of the article, and to transform the webpage to simultaneously display the restricted and the unrestricted portions of the article when the executable code component determines that the selected response is one of the plurality of different correct responses.

20. A computer implemented method for providing article and interactive digital advertising within a browser executing on a user device, the method including:

receiving a webpage and a visual digital advertisement from a server, the webpage including a reference to executable code component and article comprising a first article portion and a second article portion;

the executable code component executing within the browser, in response to receiving the visual digital advertisement from the server, transforming the received webpage to restrict access to the second article portion and simultaneously display, within the browser, the first article portion, a visual digital advertisement, an instruction relating to the visual digital advertisement, and a first plurality of possible responses to the instruction relating to the visual digital advertisement in the webpage within the browser, wherein the displayed first plurality of possible responses includes a plurality of different correct responses, that are obviously correct, and at least one incorrect response, that is obviously incorrect, wherein the instruction and the plurality of different correct responses of the first plurality of displayed possible responses reinforce a message of the visual digital advertisement, wherein the visual digital advertisement, the instruction relating to the displayed visual digital advertisement and the first plurality of possible responses are simultaneously displayed within the browser, and wherein the visual digital advertisement is displayed inline with the first article portion;

the executable code component receiving, from an input device, selection of one of the first plurality of displayed possible responses;

the executable code component, in response to the executable code component determining that the selected response is one of the plurality of different correct responses, requesting at least a portion of the second article portion from the server and receiving the portion of the second article portion from the server in response to the request; and the executable code component, in response to receiving the portion of the second article portion, transforming the webpage back to the received webpage to hide the displayed visual digital advertisement and the plurality of displayed possible responses and simultaneously display the first article portion and the second article portion in the webpage within the browser such that an entirety of the article is displayed;

the executable code component, upon determining that the selected response is one of the at least one incorrect response, further transforming the transformed webpage to replace the displayed instruction and the first plurality of possible responses with a hint for a correct response and an option to re-display the instruction and a second plurality of possible responses when the executable code component determines; and the executable code component, upon determining a selection of the option to re-display the instruction and the second plurality of possible responses, further transforming the transformed webpage to simultaneously display the instruction and the second plurality of possible responses to the instruction within the browser, wherein the second plurality of possible responses includes a plurality of different correct responses and at least one incorrect response to the displayed instruction;

wherein, before display of the visual digital advertisement, the first article portion and a portion of the second article portion are initially displayed to the user on the device for a period of time before the second article portion being, at least, partially hidden and the second article portion is displayed when the selected response is one of the plurality of different correct responses.

21. A method as claimed in claim 20, wherein the second plurality of possible responses are different from the first plurality of possible responses.

22. A method as claimed in claim 20, wherein the visual digital advertisement is positioned in the webpage between the first article portion and the second article portion, and wherein the advertisement is hidden and the second article portion is simultaneously displayed with the first article portion upon the executable code component making the determination that the selected response is one of the plurality of different correct responses.

23. A method as claimed in claim 20, wherein the instruction in combination with the at least one correct response reinforce a message within the visual digital advertisement.

24. A system including:
a processor;
a display;

an input device; and a memory;

wherein the processor is communicatively coupled to the display, the input device and the memory, and is configured to:

executing a browser application;

receive a webpage from a server, the webpage including a reference to an executable code component and a first article portion of an article including text and an image; and executing the executable code component within the browser to:

in response to receiving a visual digital advertisement from the server, transforming the received webpage to simultaneously display, within the browser, the first article portion, the visual digital advertisement below the first article portion, an instruction relating to the visual digital advertisement below the digital advertisement, and a first plurality of possible responses to the instruction relating to the visual digital advertisement below the instruction, wherein the displayed first plurality of possible responses includes a plurality of different correct responses, that are obviously correct, and at least one of the displayed first plurality of possible responses is an incorrect response, that is obviously incorrect, wherein the visual digital advertisement is displayed inline with the first article portion, and the instruction and the plurality of different correct responses of the first plurality of displayed possible responses reinforce a message of the visual digital advertisement;

receive, from the input device, selection of one of the first displayed possible responses; and upon determining that the selected response is one of the plurality of correct responses, request, from the server, second article portion of the article, receive the second article portion from the server, and transform the received webpage to hide the displayed visual digital advertisement and to simultaneously display the first article portion and the second article portion below the first article portion in the webpage within the browser, wherein the first article portion and the second article portion in the webpage are simultaneously displayed in their entirety without displaying the visual digital advertisement, the instruction, and the first plurality of possible responses upon determining that the selected response is one of the plurality of correct responses;

wherein, before display of the visual digital advertisement, the first article portion and a portion of the second article portion are initially displayed to the user for a period of time before the second article portion being, at least, partially hidden and the second article portion is displayed when the selected response is one of the plurality of different correct responses.

25. The system of claim 24, wherein the processor executing the executable code component is further configured to:

upon determining that the selected response is the incorrect response, control the display to replace the plurality of possible responses with a hint to the instruction relating to the visual digital advertisement and an option to display the plurality of possible responses to the instruction relating to the visual digital advertisement.

26. The system of claim 24, wherein the plurality of possible responses include a single incorrect response.

27. The system of claim 24, wherein the processor executing the executable code component is further configured to:

upon determining that the selected response is the incorrect response, control the display to change or randomize the plurality of possible responses.

28. The system of claim 24, wherein the processor is further configured to track user interaction with first plurality of responses and provide analytics based on the tracked user interaction with the first plurality of responses.

29. The system of claim 24, wherein after receiving the second article portion from the server, the first article portion and the second article portion are simultaneously displayed within the webpage in their entirety without displaying the visual digital advertisement, the instruction relating to the visual digital advertisement, and the first plurality of possible responses.

* * * * *